(12) United States Patent
Avila

(10) Patent No.: US 11,957,093 B2
(45) Date of Patent: Apr. 16, 2024

(54) GREENHOUSE

(71) Applicant: David Avila, Oakdale, CA (US)

(72) Inventor: David Avila, Oakdale, CA (US)

( * ) Notice: Subject to any disclaimer, the term of this patent is extended or adjusted under 35 U.S.C. 154(b) by 926 days.

(21) Appl. No.: 16/984,629

(22) Filed: Aug. 4, 2020

(65) Prior Publication Data
US 2022/0039332 A1    Feb. 10, 2022

(51) Int. Cl.
*A01G 9/22*    (2006.01)
*A01G 9/24*    (2006.01)

(52) U.S. Cl.
CPC .............. *A01G 9/246* (2013.01); *A01G 9/22* (2013.01); *A01G 9/241* (2013.01)

(58) Field of Classification Search
CPC .......... A01G 9/246; A01G 9/241; A01G 9/22
USPC .............................................. 47/17
See application file for complete search history.

(56) References Cited

U.S. PATENT DOCUMENTS

| | | | |
|---|---|---|---|
| 3,949,522 A * | 4/1976 | Kehl ..................... | A01G 9/246 47/17 |
| 4,795,415 A | 1/1989 | Francis | |
| 9,161,498 B1 | 10/2015 | Shelor | |
| 9,907,236 B2 | 3/2018 | Kamp | |
| 10,390,496 B2 * | 8/2019 | Carson ..................... | A01G 9/22 |
| 2003/0070353 A1 | 4/2003 | Mercurio et al. | |
| 2012/0000121 A1 | 1/2012 | Swann | |
| 2016/0157440 A1 | 6/2016 | Looije et al. | |
| 2018/0271031 A1 | 9/2018 | Houweling | |
| 2023/0337607 A1 * | 10/2023 | Rankin ................... | A01G 9/243 |

FOREIGN PATENT DOCUMENTS

| KR | 102628549 B1 * | 1/2024 |
| WO | 2007105168 A2 | 9/2007 |
| WO | 2018058820 A1 | 4/2018 |

OTHER PUBLICATIONS

Korean patent: Tunnel with medium integrated discharge device (Year: 2024).*
PCT International Search Report, international appl. No. PCT/US2021/044525, dated Nov. 10, 2021.
PCT Written Opinion of the International Searching Authority, international appl. No. PCT/US2021/044525, dated Nov. 10, 2021.

* cited by examiner

*Primary Examiner* — Yvonne R Abbott-Lewis
(74) *Attorney, Agent, or Firm* — Stonebridge IP, PLLC

(57) ABSTRACT

The present disclosure provides using stratification of air to reduce the amount of air in a greenhouse to manage and a conditioning chamber to precondition air prior to the air having contact with plants. A light deprivation chamber is provided with a centerline vent and operable louvres to recycle warm air and to be able to reduce the area of the building to heat by closing the light deprivation cover to create a smaller chamber to heat and recycle to conserve heat and take advantage of the heat from grow lights. The present disclosure further provides being able to cycle warm air from an upper air sink chamber back into the an air intake/conditioning chamber to conserve energy and using air tube fans to deliver quality conditioned air from a conditioning chamber to all the plants.

18 Claims, 3 Drawing Sheets

GREENHOUSE

BACKGROUND OF THE DISCLOSURE

Field of the Invention

This disclosure relates to greenhouse structures including controlled environments.

Description of the Related Art

Tension Membrane structures for cattle buildings can be very advantageous to provide an enclosed building to create a controlled environment for cattle. One needs an enclosed building to control the environment. Such buildings can be made from polyethylene. The membrane allows for natural light to penetrate the material presenting a natural lighted environment. Since the building is enclosed, air flow into the building must be managed.

There are often problems with tunnel ventilated and cross flow ventilated buildings. Both create negative pressure using fans at one wall pulling air out of the building and having cool pads with water flow at the opposing wall allowing outside air into the building, and cooling it via evaporation of water at the cool pad. One must condition all the air volume of these types of cooling buildings. Air also takes the least path of resistance so air quality in the building may be spotty due to high air flow in some areas and low air flow in others. When a door is opened, air rushes into the vacuum and the conditioning of the building may stop functioning.

A positive pressure building forces air into the building at strategic points and with the use of interior circulating fans, maintains proper air flow at the lower strata. The ridge of the building is open so cooled air comes in at the lower strata of the building perimeter, and hot air naturally rises out the ridge.

A typical greenhouse is tunnel ventilated. Meaning the building normally has fans lined up at one end wall pulling air out of the building creating a negative pressure environment. To cool the building, there are typically cool cell pads on the opposite end of the building. A cool cell pad has water trickling from top to bottom and is permeable to allow outside air to flow into the building through the pad which cools the air via evaporation (evaporative cooling).

One problem is that a negative pressure building can pull unwanted insects into the building which are predaceous to plants. Another problem is that it can also pull pollen from other plants that are in the same species causing plants to go from flower to seed. The flower is typically the product of value not the seed. Another problem is that when a door is opened into a negative pressure building outside air is sucked into the building which negatively impacts the interior air quality.

As mentioned, to cool air via evaporation, pulling air through a cooling pad is the typical method. There is no control as to how much water is taken up (absorbed) into the air flow in the form of vapor as the air moves through the cooling pads. The challenge is to provide in the summer, cooled air to the plants but at the same time knowing the amount of vapor the air has absorbed after passing through the cool pads and loading up with water vapor.

The same volume of air flow must still have enough absorption capacity to absorb the evapotranspiration, i.e., water vapor deriving from the plant photosynthesis process as the air passes over the plants and exits the building through the fans pulling air out of the building. If the air is oversaturated from the cooling pads, it cannot absorb sufficient amounts of vapor from the plants and other interior sources of moisture from daily operations, causing a spike in humidity inside the building. Too high a humidity will encourage the growth of mold and fungus on the plants and flowers which deteriorates the quality of the plants.

SUMMARY OF THE INVENTION

The present disclosure uses natural stratification of air to reduce the amount of air in the building to manage and a conditioning chamber to precondition the air prior to that air having contact with the plants. Good air quality at each plant enhances growth and quality of product from each plant. The disclosure further provides a light deprivation chamber with a centerline vent and operable louvers to recycle warm air and to be able to reduce the area of the building to heat by closing the light deprivation cover to create a smaller chamber (volume of air) to heat and recycle to conserve heat and take advantage of heat from grow lights.

The present disclosure further provides being able to cycle warm air from an upper air sink chamber back into an air intake/conditioning chamber to conserve energy and using air tube fans to deliver quality conditioned air from a conditioning chamber to all the plants. A system to oscillate the interior circulating fans using one drive and a cable linking system is also provided.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
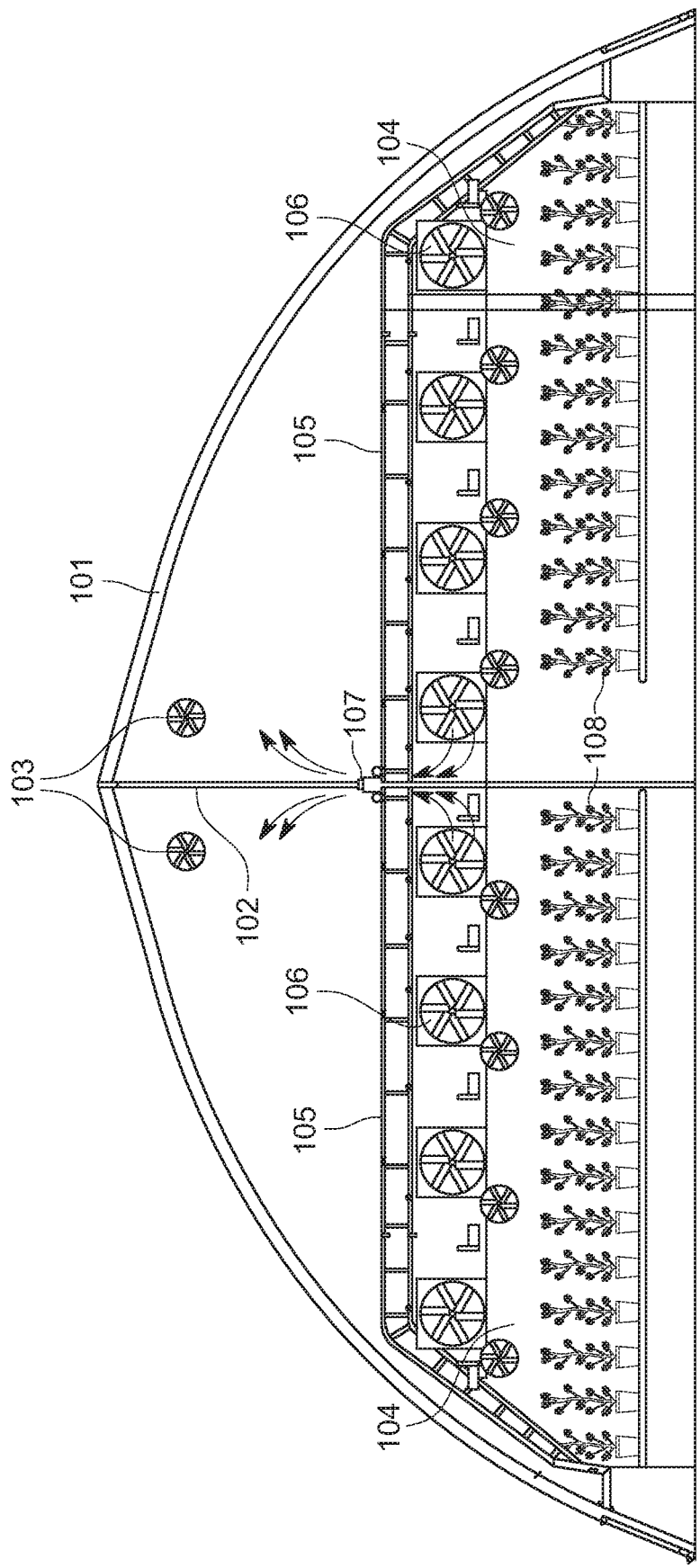
FIG. 1 shows an embodiment of a greenhouse of the disclosure.

The following detailed description is provided to assist the reader in gaining a comprehensive understanding of the methods, products, and/or systems, described herein. However, various changes, modifications, and equivalents of the methods, products, and/or systems described herein will be apparent to an ordinary skilled artisan.

The present disclosure provides a greenhouse configured to force air into the building using fans (blowing air into the building) causing it to have positive pressure. This pressure blows air out any holes which insects may use to enter the building. The incoming air may also be filtered using an insect screen with openings too small for thripe (very small insects). If pollen is a problem, a specialized filter is installed to collect any pollen from the incoming air flow. Air access chambers are used to enter the building. An air access chamber has an exterior door and an interior door. Open the exterior door, enter the chamber, close the exterior door, open the interior door and walk/drive in.

Using a psychrometric chart to determine the absorption capacity of outside air being forced into a building via intake fans can allow one to calculate at what humidity the air to be delivered to the plants must be to still have capacity to remove excessive vapor from the plants as that air leaves the building. In addition, the total vapor load inside the building must be calculated from the plants at the grow area to determine the quantity of air to push over the plants that will equal the amount of excessive vapor to remove. Knowing the vapor capacity of the incoming air and vapor load from the grow area, it can be determined what needs to be done to the incoming air to provide an optimal condition of air to the plants.

For example, water misting heads, can be used with a known quantity of water to inject a calculated amount of vapor into incoming air while leaving capacity in the air to absorb the evapotranspiration (vapor load) from the grow area to maintain a controlled amount of humidity (vapor) in the air around the plants to prevent the growth of mold and fungus on the plants. Accordingly, a specialized air intake/mix chamber is provided where incoming air is conditioned both in winter and summer prior to being forced into the grow chambers to provide quality air with proper humidity and temperature to all plants.

The present disclosure provides using the physiology (psychometrics) of air to manage the quality of the air at the plants' level (e.g., floor to about 14 feet) for maximum growth. Air changes in volume and weight under different, predictable, conditions of heat (BTUs) and vapor (water) it contains. This is then used to calculate the air flow required to maintain air quality at the plants.

A weather station outside the building is used to measure heat and humidity at the outside air as a baseline condition of the air. A computer program may be used to operate the building's functions. That is, the computer can calculate the energy of the incoming air (e.g., BTUs and % vapor); calculate the interior air conditions via information collected from sensors inside the grow areas (e.g., floor to about 14' above the floor) and at the upper air chamber (e.g., above 14') to operate fans, louvres, misters, in concert to alter and manage air quality at the plant grow area. In embodiments, the building may be about 25' tall.

In one example, in summer conditions, the air will be hot and have a certain percent humidity. First, the proper amount of mist must be added to the incoming air to cool it but not so much as to cause the air to not to be able to collect the heat and vapor loads generated at the grow chambers. Adding mist to the air cools the air down, causing one pound of air to displace a smaller area. That is, one pound of hot air occupies a greater volume than one pound of cooler air which causes the hot air to rise above cooler heavier air. The cooler heavier air that has been formulated at an air intake/conditioning chamber is delivered to the plants via fan tubes evenly over the entire grow chamber areas directly to the plants.

The fresh conditioned air is blown into the grow chambers and is heavier as previously explained, than the air that has been in the grow areas absorbing heat from the sun and moisture from the plants and other interior sources that causes the loaded air to rise up into the upper chamber (14' and above) and out of contact with the plants. The loaded air at the upper chamber will then be pushed out of the building via operable louvres at the end wall. Note, the upper air chamber has no plants, thus, the air quality at the upper chamber is managed to prevent condensation only. Too much heat and or vapor for the plants is not a consideration for the upper chamber. Thus, the upper air chamber is a cushion to air quality for it can absorb plant gases, heat, and vapor without concern for plant quality.

Therefore, the air volume of the building that needs to be conditioned is the approximately floor to 14' area, i.e., a grow chamber. This is in contrast to a tunnel ventilated type building that has to condition the whole volume of air inside the building because there is no stratification of the building's interior air. Consequently, the condition of the full air volume of the building must be controlled. This increases air turnover which requires more energy for fan power to move a larger volume verses conditioning only the critical area at the plants.

In addition, the air quality for the plants in a tunnel ventilated type greenhouse cannot be managed to provide high quality air to each plant for the air is conditioned at the intake end and degrades as it flows through the building. In the winter, the air cools before it reaches the plants at the exhaust end or in the summer, it gets too wet and hot after absorbing moisture and gases generated from the plants.

Fan tubes are a round, clear plastic tube with small air discharge holes (e.g., about 2" to 3" in diameter) spaced at the bottom of the tube connected to a fan at one end which force air through the tubes for the full length of the building. The fans may be installed at a common wall between the air intake/conditioning chamber and the plant grow chamber and pull conditioned air out of the chambers and deliver conditioned air evenly to each plant throughout the total grow areas via holes along the bottom of the tubes.

These holes are designed to evenly discharge an equal amount of air from each hole which in turn delivers the same quality of air to each plant throughout the whole of the building. This is contrary to a tunnel ventilated type building which moves the air from one end to the other. Using stratification of the air to manage the building's interior air, energy savings can also be achieved.

In another example, during winter the outside air is cold and will have a lower percent humidity. A heating chamber can be placed in front of the fan air tubes. The cold exterior air and intake chamber passes through the heaters before being pulled by tube fans and distributed into the grow chamber evenly over the plants. As described above, this air that has been heated is lighter than the cold air at the grow chamber. This presents a problem since hot air tends to rise over the existing colder air at the plants. To address this, the grow chambers may be fitted with circulation fans which are directed down to force the warm air from the air tubes down and around the plants heating them and absorbing moisture preventing the growth of molds and fungus. Nevertheless, the warmer air will rise up into the upper air chamber. The building can thus also conserve heat by recycling the warm air back through the air intake/conditioning chamber. In a tunnel ventilation building warm air is wasted by exhausting out the end of the building or wasted at a ridge vented building because the warm air naturally rises out of the building via ridge vents.

The present invention uses an upper chamber as a heat sink. The system can recycle the upper chamber's warm air back into the intake/conditioning chamber tempering the colder intake air, and routing that air as normal through the heaters and through the fan tubes back to the plants and rising again up to the upper chamber. This can be accomplished using louvres at an upper portion of a common wall between the air intake/conditioning chamber and the grow/upper air chambers. If the air that has cycled from the plants up into the upper air chamber, which will be warmer than the incoming outside air, does not contain too much vapor, the air can be recycled by closing the louvres located at the end wall of the building and opening the louvres at an upper air chamber wall to recycle the heated air. If the air at the upper chamber is too wet and cannot absorb further moisture at the plants, exhaust end wall louvres can be opened and the air chamber wall louvres closed, which forces the wet air out the exhaust end of the building.

The grow chambers also have interior frames that may be, for example, at approximately 18 feet on center and approximately 14 feet high to support a light deprivation cover. To cause plants to flower 12 hours of light and 12 hours of dark is typically needed. Consequently, the plants can be mechanically covered to block sunlight. The cover over the trusses can create an interior chamber. That is, a separation between the grow chambers and the upper air chamber. The fan tubes may be below the deprivation cover at the grow chambers to maintain the quality of the interior air using the same heat/cool air delivery. A problem is relieving the air from the enclosed grow chamber. Exhausting air evenly from a grow room chamber is a problem for which state-of-the-art greenhouse designs have no solution.

To address this challenge, the present disclosure provides a centerline exhaust vent. This vent is at the center of the grow room chamber and is a continuous front (fan tube end) to the opposite end of a grow chamber. The total cross section area of this vent is designed to handle incoming air flow from all the fan tube fans.

This then allows the conservation of heat in the winter. Louvres can be installed at the lower portion of the common wall between the intake/conditioning air chamber and the grow chambers. If the grow chamber air is not too wet, the center line vent can be closed, and the lower louvres can be opened causing warm air to go back into the heat chamber below the heaters. Consequently, the air can then blend with the cold incoming outside air and be heated to the desired temperature and forced via the fan tubes back over the plants saving heat.

This feature has extra value in the winter for when the days are short and cold, the dep chamber cover can be closed at dark and taking advantage of the heat from the numerous number of grow lights required to extend the short daylight hours to 12 hours. By managing the grow chamber louvres and the centerline vent, one can take advantage of the light heat resulting in less natural gas burning with the heaters. Ultimately this saves energy and money. State-of-the-art greenhouses currently cause great variation in air quality around the plants.

The polyethylene roofing material may be of two types. One at the air intake chamber which lets in less light but with a 20-year life versus a 5-year life material over the plants which allows much more natural light at the plants.

The present disclosure also provides a greenhouse building that can be modified for each area that it is to be built. The building may be constructed so that each component can be sized to perform more or less work depending on the site-specific needs. The buildings can also be configured in various widths and lengths as necessary to address local conditions in a particular greenhouse environment.

FIG. 1 shows greenhouse 101, upper air sink (from intake) chamber 102 comprising circulation fans 103, grow chambers 104 and frames or trusses 105, fans and fan tubes 106 disposed between the upper air intake chamber 102 and grow chambers 104, and centerline vent 107. FIG. 1 further shows plants 108 in the grow chambers 104.

Figure 2:
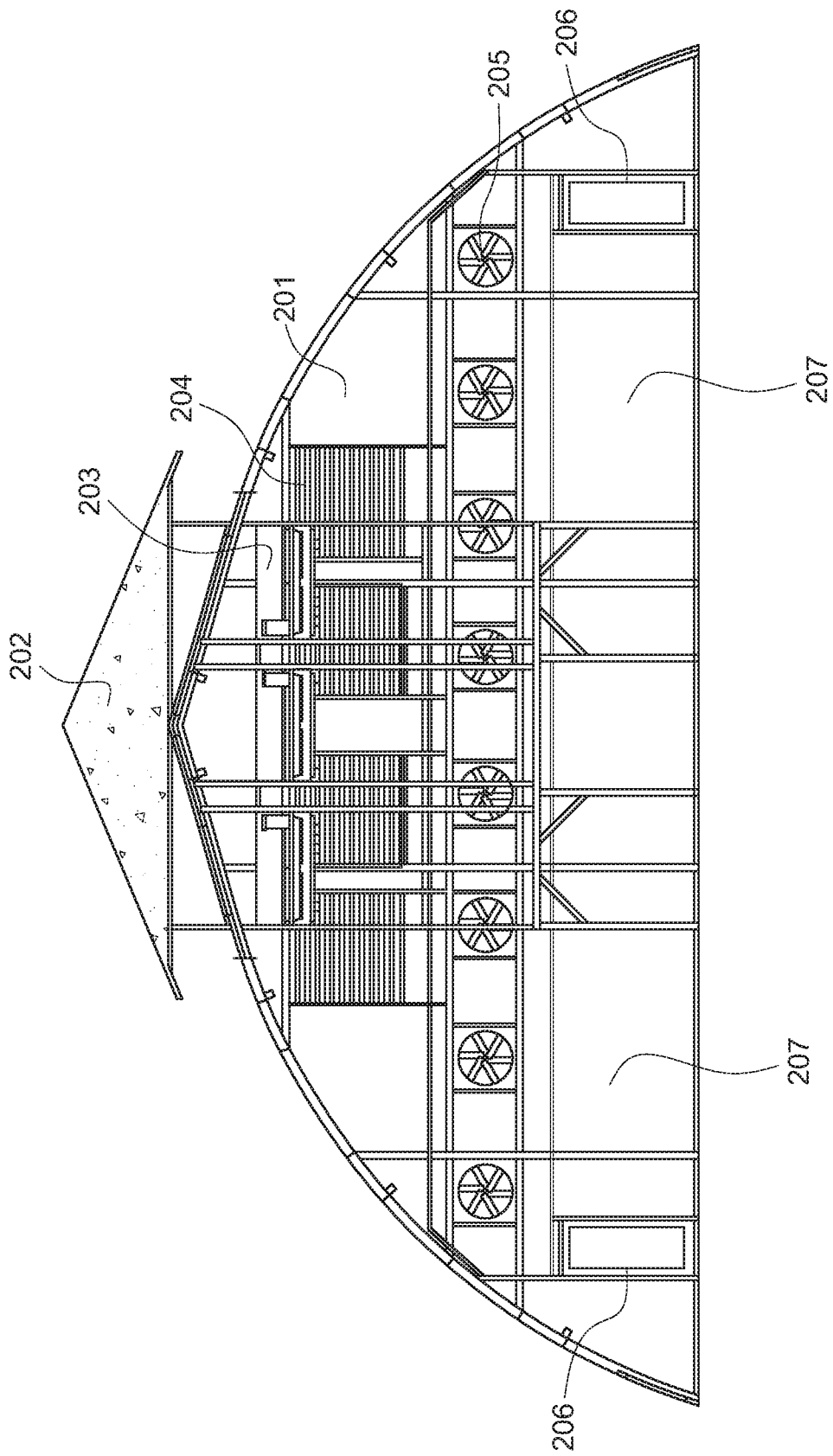
FIG. 2 shows another embodiment of a greenhouse of the disclosure.

FIG. 2 shows another embodiment of greenhouse 201, air intake chamber roof structure 202, air intake fans 203, louvres 204, fans and fan tubes 205, doors 206 and heat/mist chambers 207.

Figure 3:
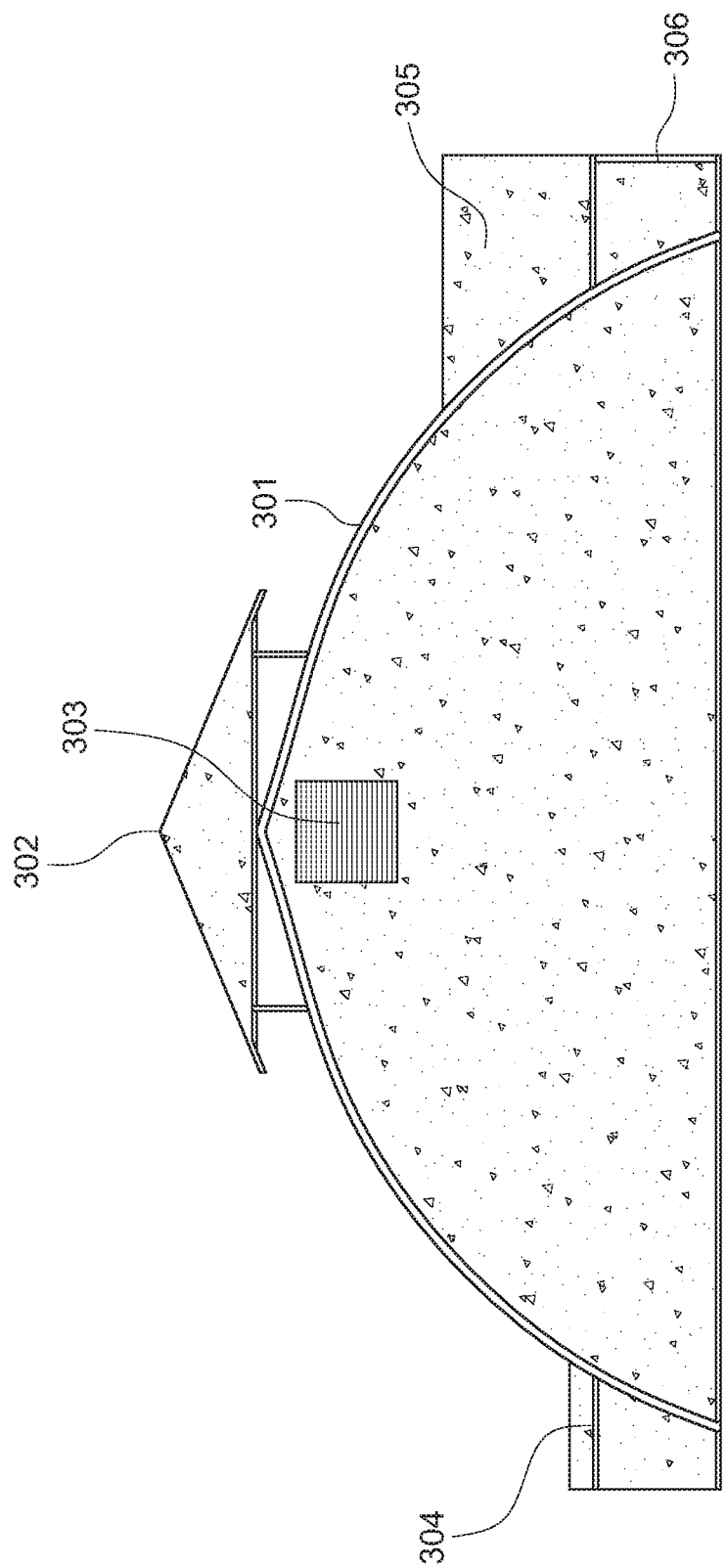
FIG. 3 shows another embodiment of a greenhouse of the disclosure.

FIG. 3 shows another embodiment of greenhouse 301, air intake chamber roof structure 302, louvre 303, access chamber 304 and access chamber 305 with access chamber door 306. An access chamber may include one or more doors and a door may be, for example, a rollup door.

While this disclosure includes specific examples, it will be apparent after an understanding of the disclosure of this application has been attained that various changes in form and details may be made in these examples without departing from the spirit and scope of the claims and their equivalents.

I claim:

1. A greenhouse comprising:
   an upper air sink chamber comprising an air intake chamber comprising circulation fans, louvres, and a misting apparatus;
   one or more grow room chambers defined by one or more frames comprising a light deprivation cover configured to be removable;
   one or more fans comprising fan tubes disposed between the upper air sink chamber and one or more grow room chambers; and
   a centerline exhaust vent;
   wherein air from the air intake chamber flows into the one or more fans comprising fan tubes and is delivered to the one or more grow room chambers via the fan tubes;
   and further wherein air from the one or more grow room chambers is recirculated back to the upper air sink chamber via the centerline exhaust vent.

2. The greenhouse of claim 1, wherein the centerline vent is disposed at or near the center of a grow room chamber and extends to opposite ends of a grow room chamber.

3. The greenhouse of claim 2, wherein the centerline vent is configured to discharge air flow from all fan tubes.

4. The greenhouse of claim 1, further comprising sensors in the upper air sink chamber and one or more grow room chambers to measure the energy of the air in the upper air sink chamber and the one or more grow room chambers in air temperature, British Thermal Units (BTUs), and percent water vapor content.

5. The greenhouse of claim 4, further comprising a computer configured to operate greenhouse fans, louvres, heaters, misting apparatus, and manage air energy in temperature, BTUs, and percent vapor content in the one or more grow chambers.

6. The greenhouse of claim 1, further comprising a weather station outside the greenhouse to measure heat and humidity of air outside the greenhouse.

7. The greenhouse of claim 1, wherein outer walls of the green house comprise polyethylene.

8. The greenhouse of claim 1, wherein the air intake chamber further comprises one or more heaters.

9. The greenhouse of claim 1, wherein the fan tubes traverse a full length of the greenhouse.

10. The greenhouse of claim 1, wherein the fan tubes further comprise holes along a bottom for distributing air to the one or more grow chambers.

11. The greenhouse of claim 10, wherein the holes deliver conditioned air evenly throughout the one or more grow chambers.

12. The greenhouse of claim 11, wherein the holes are approximately 2 to 3 inches in diameter.

13. The greenhouse of claim 10, wherein the fan tubes further comprise a heating chamber.

14. The greenhouse of claim 13, wherein the one or more grow chambers further comprise circulation fans which are configured to direct air downward to force air from the air tubes down and around plants.

15. The greenhouse of claim 1, wherein the frames of the grow chamber range from approximately 14 feet to approximately 18 feet in height.

16. The greenhouse of claim 1, further comprising louvres between the air intake chamber and the one or more grow chambers.

17. The greenhouse of claim 1, wherein the roof comprises polyethylene.

18. The greenhouse of claim 1, further comprising one or more access chambers comprising one or more doors.

* * * * *